A. M. Newman,
Sharpening Reciprocating Saws.
No. 82,240. Patented Sep. 15, 1868.
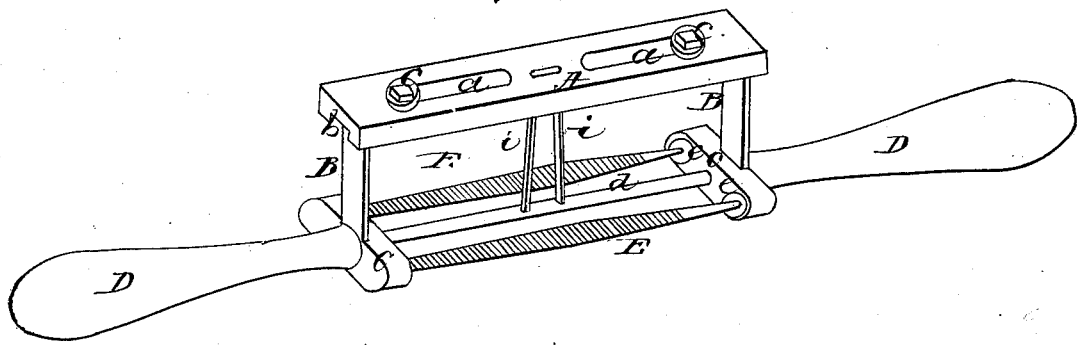
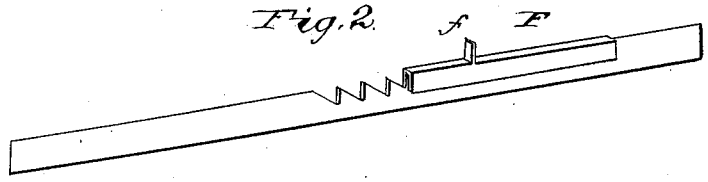
Witnesses  
Wm. Hausleben  
Leopold Ebert
Inventor  
A. M. Newman  
per Alexander Mason  
Attys.

United States Patent Office.

A. M. NEWMAN, OF TERRE HAUTE, INDIANA.

Letters Patent No. 82,240, dated September 15, 1868.

IMPROVEMENT IN SAW-SHARPENING DEVICE.

The Schedule referred to in these Letters Patent and making part of the same.

TO ALL WHOM IT MAY CONCERN:

Be it known that I, A. M. NEWMAN, of Terre Haute, in the county of Vigo, and in the State of Indiana, have invented certain new and useful Improvements in Saw-Filing Machine; and do hereby declare that the following is a full, clear, and exact description thereof, reference being had to the accompanying drawings, and to the letters of reference marked thereon.

The nature of my invention consists in placing two files in a slide or frame, in such a manner that a saw may be filed with perfect ease, and have all its teeth of the same pitch.

To enable others skilled in the art to make and use my invention, I will proceed to describe its construction and operation.

In the annexed drawings, forming part of this specification, A represents a slotted bar, forming the top of a frame, of which the standards B B are the sides. This bar is grooved underneath, (groove marked $b$,) for the upper ends of the standards to slide in backwards and forwards, the said upper ends being bent, at right angles from the standards, inwards, and fastened to the bar A, at any point desired, by means of screws $c\ c$, passing through the slots $a\ a$ on the bar, and into the said upper ends of the standards B B.

The lower ends of the standards form the heads C C, which extend on each side thereof, and are provided on the inside with washers $e\ e$, into which the ends of the files E E are inserted.

Through the centre of the heads a rod, $d$, passes, which is fastened to one of the handles D, and on its other end provided with screw-threads, which fit into a female screw in the other handle, so that when the ends of the files are inserted into the washers $e\ e$, by turning this handle, they are screwed firmly into any position desired, after which the standards B B are tightened or screwed to the bar A by the screws $c\ c$, as before mentioned.

From the centre of the bar A, two guides, $i\ i$, extend downward, which guides rest on the rod $d$, and can be placed at any angle desired, for a purpose hereafter to be mentioned.

F represents a slide, which rests on the teeth of the saw to be filed, as shown in fig. 2, and which is provided on its upper side with a pin or lug, $f$.

When a saw is to be filed, the slide is placed on the saw, and one of the files between the two first teeth and the bar A, against the pin or lug $f$ on the slide. The machine is then turned, so that the saw may become parallel to one of the guides $i\ i$.

By placing one of the guides $i$ at such angle to the rod $d$ as may be desired, and holding the saw parallel to it, the teeth will all get exactly the same fleam or pitch.

Having thus fully described my invention, what I claim as new, and desire to secure by Letters Patent, is—

1. The adjustable standards B B, provided with heads C C, and washers $e\ e$, for the purpose of securing the files, and adapting the machine to different-sized files, substantially as and for the purposes herein set forth.

2. The combination of the slotted bar A, standards B B, handles D D, rod $d$, and guides $i\ i$, constructed and operating substantially as and for the purposes herein set forth.

In testimony that I claim the foregoing, I have hereunto set my hand, this 20th day of April, 1868.

A. M. NEWMAN.

Witnesses:
 RICHARD DUNIGAN,
 A. C. DUNBURGH.